United States Patent [19]

Fiala

[11] 4,260,122
[45] Apr. 7, 1981

[54] CLAMPING WALL PLUG FOR ELONGATED BODIES

[76] Inventor: Johann Fiala, Griegstrasse 1 - 3/9, A-1200 Wien XX, Austria

[21] Appl. No.: 10,719

[22] Filed: Feb. 8, 1979

[30] Foreign Application Priority Data

Feb. 17, 1978 [AT] Austria ................... 1164/78

[51] Int. Cl.³ ............................................. F16B 15/02
[52] U.S. Cl. ........................................ 248/71; 411/61
[58] Field of Search ............ 248/73, 74 B, 71, 74 PB; 85/85, 87, 80

[56] References Cited

U.S. PATENT DOCUMENTS

| 1,396,569 | 11/1921 | Girvan | 85/85 |
| 3,737,128 | 6/1973 | Schuplin | 248/71 |
| 3,905,570 | 9/1975 | Nieuwveld | 248/71 |

FOREIGN PATENT DOCUMENTS

| 1384307 | 2/1964 | France | 248/71 |
| 2151175 | 7/1973 | France | 85/85 |
| 401379 | 1/1943 | Italy | 85/85 |

Primary Examiner—Francis K. Zugel
Attorney, Agent, or Firm—Karl F. Ross

[57] ABSTRACT

A double-leg plug has its shanks connected together at one end by an arcuate hinge ligature which is of circular configuration when the shanks of the plug are brought together and inserted in a hole in a wall. The circular portion forms an eye in which a cable, tube, pipe or other elongated body can be received and clamped. The confronting faces of the legs, which can be externally toothed, are formed with a groove and a projection, respectively, limiting relative longitudinal displacement of the shanks when the legs are brought together. The depth of penetration of the shanks into the bore in the wall can be limited by an abutment.

3 Claims, 8 Drawing Figures

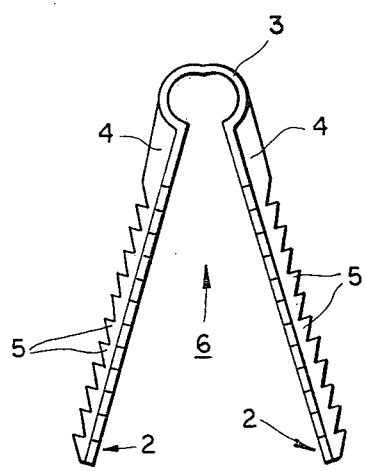
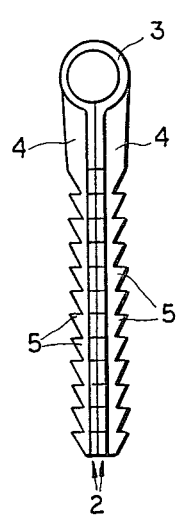
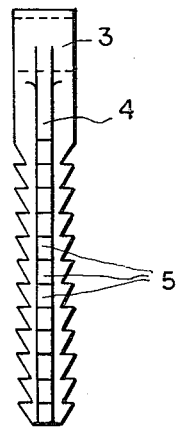
FIG.1　　FIG.2　　FIG.5
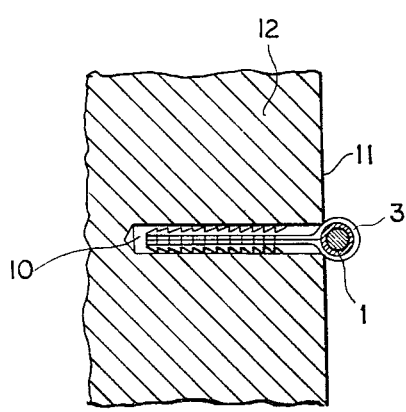
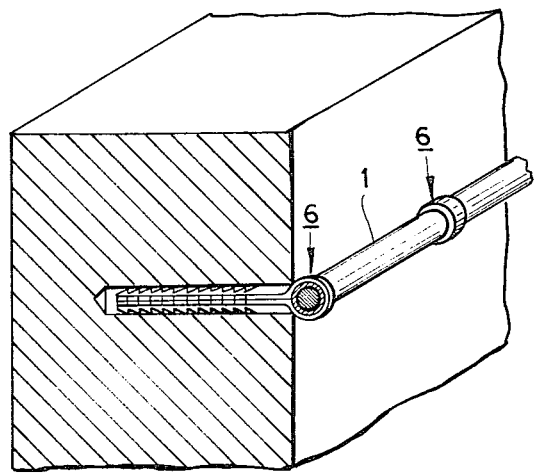
FIG.3　　FIG.4

CLAMPING WALL PLUG FOR ELONGATED BODIES

FIELD OF THE INVENTION

The present invention relates to a clamping wall plug adapted to affix a cable, tube, pipe or other elongated body to a wall.

BACKGROUND OF THE INVENTION

Wall plugs have been provided heretofore with cable clamps, hooks or the like in which a pipe, cable or other elongated body can be received for securing such body to a wall. Generally the wall is provided with a bore into which the shank of the plug is inserted so that only a hook or other socket receiving the elongated body remains outside the bore to accommodate the body. The shank of the plug may be serrated to prevent inadvertent withdrawal from the hole and the plug may be tapered or of uniform thickness as desired.

Plugs of this type are described, for example, in the Australian Open Application No. 40,566/72 and U.S. Pat. No. 780,956.

One end of the shank is free, in both of these constructions, to enable insertion of the shank into a bore while the other end is formed with a hook or like seat for the elongated body. In the latter patent, the seat for the body is formed as a separate piece which can be connected to the plug and which can be held thereon by a screw which can serve to press portions of the shank against the wall of the bore.

Both of these systems afford limited security for anchoring the cable to the plug and frequently are not satisfactorily anchored in the wall.

OBJECTS OF THE INVENTION

It is the principal object of the present invention to provide a clamping wall plug, i.e. a plug adapted to be inserted into a wall and to be engaged with or to support a cable, pipe or other elongated body, whereby the disadvantages of earlier systems are avoided.

It is also an object of the invention to provide a relatively simple but secure device for reliably affixing an elongated body to a wall.

SUMMARY OF THE INVENTION

These objects and others which are attained in accordance with the present invention are met with a wall plug having a pair of shanks which are hingedly interconnected at one end by a ligature which, when the shanks are brought together, forms a circular eye within which an elongated body such as a cable or pipe can be received.

The free ends of the shanks, when they are brought together, can be inserted into a bore in the wall and preferably are externally toothed to grip the wall of the bore.

In this construction of a clamping wall plug according to the invention, the cable is completely surrounded by the ligature or hinge portion and by the shanks which are brought together to form a circular eye completely surrounding the cable. As a result, the cable is fully clamped in place and cannot be pulled out of the eye in a direction transverse thereto and, where the eye tightly hugs the cable, cannot be withdrawn even axially of the eye and the cable.

According to a feature of the invention, the two legs are provided with confronting surfaces one of which is formed with a groove while the other is formed with a projection receivable in the groove and preventing relative longitudinal displacement of the legs once they are brought together.

According to still another feature of the invention, the teeth formed externally on the legs are shaped so as to be inclined inwardly in a saw-tooth configuration, in the direction of the free end of the plug, so that the latter can be readily inserted into the bore but withdrawn therefrom only with difficulty.

According to yet another feature of the invention, the toothing of the legs terminates at a location slightly removed from the eye.

The shanks can, according to another feature of the invention, be of generally T-section with the confronting surfaces formed along the broad side of the crossbar of the T.

In setting the device in place, the cable is inserted into the eye between the shanks while they are spread apart and the shanks are then brought together to lock the cable in place, whereupon the shanks are inserted into the bore until the entire length of toothed portion is received therein. Alternatively, the plug may be inserted to a lesser depth depending upon the position of the cable desired.

When it is advantageous to maintain a given distance between the tube or cable and the wall, at least one of the shanks is provided externally with a transverse projection which forms an abutment preventing further insertion of the plug into a masonry or other wall.

The mating projection and groove along the confronting faces of the shanks prevent, when the device is used to retain heavy or stressed bodies, the eye from enlarging by longitudinally shifting one of the shanks relative to the other and thereby also restrict withdrawal of the clamp from the wall as a result of this relative longitudinal movement.

BRIEF DESCRIPTION OF THE DRAWING

The above and other objects, features and advantages of the present invention will become more readily apparent from the following description, reference being made to the accompanying drawing in which:

FIG. 1 is an elevational view of a first embodiment of a clamping plug, according to the invention, in its open state;

FIG. 2 is an elevational view of the plug in its closed state as seen from the same side as FIG. 1;

FIG. 3 shows the plug inserted into a wall which is seen in cross section and with a cable clamped in place;

FIG. 4 is a perspective view of the assembly illustrating a plurality of plugs supporting a cable on a wall;

FIG. 5 is another elevational view, taken from the side, of the plug of FIGS. 1 and 2;

SPECIFIC DESCRIPTION

Figures 6, 7, 8:
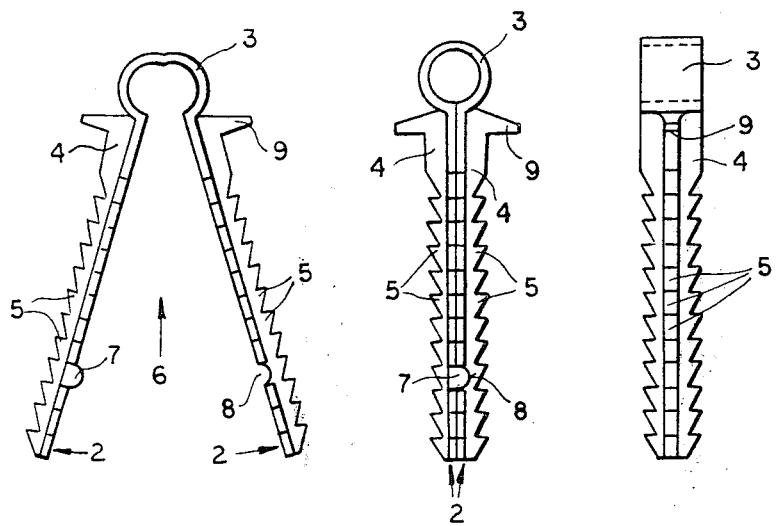
FIG. 6 is a view similar to FIG. 1 showing another embodiment of the plug of the invention in a front view in an open position.
FIG. 7 is a front elevational view of the plug of FIG. 6 in a closed state.
FIG. 8 is a side elevational view of the plug of FIGS. 6 and 7.

From FIGS. 3 and 4 it will be apparent that a cable 1 can be affixed to a wall 12 by forming a plurality of bores 10 opening at the face 11 thereof.

A cable 1 can be affixed to the wall 12 by inserting plugs generally represented at 6 into the bores 10 which are dimensioned to snugly receive these plugs and to allow three rows of sawteeth 5, 5'0 on each of the plugs to engage the wall of the bore and prevent withdrawal therefrom. Each plug 6, as can be seen in FIGS. 1, 2 and 5, comprises a pair of legs or shanks 2 of T section, each shank having a central rib 4 with sawteeth 5 defining the web of the "T" and two lateral ribs 4' with sawteeth 5' defining its cross-bar.

The free end of the shank can be tapered, e.g. by virtue of the inwardly tapered sawtooth configuration of the teeth, to facilitate insertion into the bore 10.

The two shanks 2 are interconnected at their opposite ends by a hinge-like ligature 3 forming, when the shanks are brought together into a closure position (FIG. 2), a circular eye in which the cable is received. In this closure position, confronting surfaces of the shanks formed by ribs 4' contact each other to provide a bolt with a cruciform profile having four toothed flanks.

To reinforce the eye region of the plug, tooth-free edge portions of the flat ribs 4 and 4' reach from the eye to the rows of sawteeth 5, 5' and, in the case of the ribs 4 lying in the plane of the eye, are tapered in the direction of the free ends of the shanks. The ribs 4 can, as can be seen in FIGS. 3 and 4, be wedged into the bores 10 to lock the plugs around the cable and further secure the plugs within the bores.

In the embodiment illustrated, in FIGS. 1–5, the straight eedge portions of ribs 4 are tangent to the two semicircles formed by the ligature or connecting member 3.

In use, the shanks are spread apart (FIG. 1) and the cable is inserted into the opening sabove the shanks and within the space surrounded by the ligature 3. The cable is initially gripped by the shanks 2 before the cable is thrust into the space surrounded by the ligature 3, by virtue of the convergence of the shanks towards this space (FIG. 1). The cable can thus be thrust into the space beyond these shanks. Before closure of the shanks, the plug is positiond at the desired location by moving it along the cable or moving the cable through the eye.

Thereupon, the shanks 2 are pressed together and the cable is locked in place in the circular eye which thus results. While the shanks are held together, the plug is inserted into the bore and assumes the position shown in FIGS. 3 and 4. Before the plug is fully thrust into the bore, the cable may be sufficiently free to be moved if desired. When the plug is thrust further into the bore, however, the tapered edges of ribs 4 wedgingly engage the bore and are compressed by the walls thereeof so as to lock the cable in place within the eye of the plug. The cable is thus clamped and the plug is anchored.

Naturally, it is also possible to first partially insert the plug in the bore of the wall and then thread the cable through the eyes of the plugs thus inserted, whereupon the plugs can be pressed home to lock the cable in place.

The plug of the present invention has been found to be especially effective for the mounting of electric power cables, telephone cables and the like in concrete walls of subsurface structures, for example, vaults, conduits, tunnels and the like, the walls of which may be composed of concrete.

When used for this purpose, the plugs avoid the disadvantages which have been encountered heretofore with nail clamps and the like which are driven into the wall and frequently cannot be set firmly therein or may be damaged by the impact of nailing.

In FIGS. 6–8 I have shown another embodiment of the present invention in which the plug is illustrated in the same positions as in FIGS. 1, 2 and 5. Here similar reference numerals are utilized to indicate identical or corresponding structure.

In this embodiment, however, the confronting faces of the shanks 2 are formed respectively with a groove or opening 8 and a projection or key 7 which fit tightly together when the shanks are brought together (FIG. 7) to prevent relative longitudinal movement of the shanks. Thus, the interfitting formations 7, 8 keep the sawteeth 5' of the contacting ribs 4' of the two shanks aligned in their closure position.

In this embodiment, moreover, each of the shanks is formed with an outwardly extending projection, flange or barb 9 between the eye and the respective rib 4 so as to form a stop preventing excessive insertion of the plug in the bore.

This configuration has been found to be especially advantageous when the eye must be positioned with a precise distance from the surface 11 of the wall. Here, too, the straight edge portions of the ribs 4 lie on tapering lines which are tangent to the eye and converge toward the rows of sawteeth 5 in the position of FIG. 7.

Naturally, other abutment means and other interfitting means can be used to form the stop and the means preventing relative longitudinal displacement of the shanks.

For example, instead of a single pin on one shank and a single groove, bore or recess in the opposing shank, each shank may be provided with a pin while the opposite shank is formed with a bore facing the pin and receiving same. In another alternative, one shank may be provided with a multiplicity of such pins while the other shank is formed with a corresponding number of bores, grooves or like female formations adapted to receive the corresponding male formations.

Naturally, the two shanks can be cemented together along their mutually confronting faces to prevent longitudinal displacement.

In still another alternative, the abutment 9 can be provided on only one of the shanks if desired. The double abutment shown in FIG. 6 has been found to facilitate spreading of the shanks since the two projections 9 can be engaged between the index and middle fingers in a manner analogous to syringe operation while the thumb presses against the ligature 3.

The embodiment of FIGS. 6–8 operates in a manner similar to that of FIGS. 1, 2 and 5.

The plug shown in the drawing can be composed of a synthetic-resin material, especially a relatively strong polymer such as a polyester or a nylon, the ligature 3 being formed unitarily, integrally and in one piece with the shanks.

A comparison between FIGS. 2 and 7, on the one hand, and FIGS. 5 and 8, on the other hand, shows that the combined width of the contacting ribs 4' is roughly equal to the width of the individual ribs 4 perpendicular thereto.

I claim:

1. A clamping plug for affixing an elongated body to a member provided with a bore, comprising a pair of shanks receivable in said bore when pressed together, and a flexible ligature interconnecting corresponding ends of said shanks to form a circular eye of a diameter larger than the combined width of said shanks when they are pressed together in a closure position in which said eye is adapted to receive said body, each shank being of T section with a web in the plane of the eye and a cross-bar perpendicular thereto forming three flat, mutually orthogonal ribs each having an outer edge provided with a row of sawteeth adapted to grip the wall of the bore, said shanks contacting each other in their closure position along confronting surfaces formed by the cross-bars of their respective T's to constitute a bolt of cruciform cross-section with four toothed flanks, said rows of sawteeth being separated from said eye along each rib by a straight edge portion, the straight edge portions in the plane of the eye lying on lines which are substantially tangent to said eye and which taper and converge in said closure position toward said rows of sawteeth.

2. The plug as defined in claim 1 wherein the straight edge portions in the plane of the eye are provided with outwardly projecting abutments in the vicinity of said eye for limiting the penetration of said bore by said shanks.

3. The plug as defined in claim 2 wherein said shanks are provided, near their ends remote from said eye, with interfitting formations keeping the sawteeth on said cross-bars aligned in said closure position.

* * * * *